UNITED STATES PATENT OFFICE.

RUSSELL WILLIAM MUMFORD, OF NEW YORK, N. Y., ASSIGNOR, BY MESNE ASSIGNMENTS, TO DARCO CORPORATION, OF WILMINGTON, DELAWARE, A CORPORATION OF DELAWARE.

PROCESS OF MAKING A PURIFYING AGENT.

1,396,773.   Specification of Letters Patent.   Patented Nov. 15, 1921.

No Drawing.   Application filed April 9, 1918. Serial No. 227,544.

*To all whom it may concern:*

Be it known that I, RUSSELL WILLIAM MUMFORD, a citizen of the United States, residing at New York, in the county of New York and State of New York, have invented certain new and useful Improvements in Processes of Making a Purifying Agent, of which the following is a specification.

This invention relates to purifying agents and processes of making same; and it comprises a method of preparing a compound purifying agent having a basis of kieselguhr (diatomaceous earth) and containing decolorizing carbon interiorly incorporated therein, such compound purifying agent uniting the power of clarifying liquids with that of decolorizing the same, wherein kieselguhr is impregnated with a solution of a colloid organic material, such as starch, formed into a dough-like mass and slowly heated through a range of carbonizing temperatures ending above 600° C.; all as more fully hereinafter set forth and as claimed.

In the purification of various liquids, such as sugar solutions, glue solutions, oil, glycerin, etc., it is ordinarily desirable to decolorize them as far as possible and also to clarify them; to remove all turbidity. For decolorization, boneblack was formerly almost the only agent employed but many others are now in use; the most effective being certain materials commercially known as "decolorizing carbons" and made from various vegetable substances. These carbons often have a very high degree of decolorizing activity, some being many times as effective as boneblack, but they have no clarifying power; they do not tend to collect and remove the very fine particles in a state of suspension or semi-solution to which turbidity is due. On the other hand, because of their fineness, they often contribute a measure of turbidity themselves, giving a blackish cloud in the solution. Clarifying is therefore usually done by special agents, of which kieselguhr is one of the most effective. Treatment with decolorizing carbon in the art is often followed by a treatment with kieselguhr.

Kieselguhr ("diatomaceous earth") is a fine-particled natural material composed of porous silicious skeletons of various diatomaceæ; and though it has no power of decolorizing colored solutions, it does have in a high degree the power of collecting or flocculating fine suspended matter.

It is the object of the present invention to make a compound preparation having a basis of kieselguhr which shall unite a decolorizing activity with the clarifying activity of such kieselguhr. To this end, I first impregnate kieselguhr with a solution of a carbohydrate, or the like, and then slowly char through a wide range of temperatures ending above 600° C.; charring being advantageously in a vented retort through which a current of dry steam is passed. In so doing, the kieselguhr becomes interiorly charged with decolorizing carbon of a high degree of activity.

All vegetable and animal materials when charred, that is, when heated without access of air, or with only a small access of air, to a temperature approximating a red heat, give a residue of carbon. But it is only rarely and in operating under specially regulated conditions that this residue of carbon has enough decolorizing activity to warrant its technical use in purifying liquids. Ordinary charcoal, for example, produced by charring wood in the ordinary way has, for practical purposes, too little decolorizing activity to warrant its use. In charring wood as the temperature goes up, the first action is the evolution of various tars, vapors and gases; and these products in their turn undergo decomposition with deposition of carbon. In all ordinary charring operations, this secondary production of carbon goes on simultaneously with the primary charring, with the result that the pores of the primary carbon produced by charring are usually impregnated and clogged with secondary carbon. In other words, with any rapid heating operation no opportunity is afforded for the primary tars, vapors and gases to get away from the material being charred and the char left is virtually a composition of carbon from two sources. In making ordinary charcoal, it is of course the object to accomplish this pore-filling result since a charcoal as dense as possible is wanted for all the purposes of ordinary charcoal. In making decolorizing carbon of a high degree of activity, as I have discovered, this sudden heating and rapid charring are destructive of activity in the product. In another application, Serial No.

167,971, (Patent No. 1,286,187) I have described and claimed a method of making decolorizing carbon of a high degree of activity wherein vegetable materials are slowly charred through a wide range of temperatures ending above 600° C.; the slowness of heating and the other conditions of action being so regulated as to afford ample time and opportunity for the tars, gases and vapors to get away from the material prior to depositing secondary carbon therein. Ordinarily I heat in a vented retort; or I may heat in shallow layers in a furnace chamber containing hot neutral or indifferent gases given off as the products of combustion from what are known as "surface combustion burners"; burners fed with air and gas in the exact proportion necessary for combustion. In the embodiment of my invention more particularly described in said prior application, the decolorizing carbon is made from lignite granules, peat, wood, wood waste, etc., in granular form; the granules, where not containing much soluble colloid matter, being impregnated therewith as by a treatment with starch or the like. In carrying out this process I find it advantageous to mix the materials with a certain amount of granular mineral matter to act as a spacing agent between the granules to be carbonized. The use of such a spacing agent is advantageous in facilitating extrication of tars, vapors, etc. After the decolorizing carbon preparation is made this mineral matter may be removed in any convenient manner, as by sedimentation, the use of acids, etc.

The same principles are applicable in the present invention. In making my new preparation I impregnate kieselguhr with a small amount of soluble colloid material capable of charring with production of carbon and then slowly heat in the manner described, giving ample opportunity for escape of vapors and gases capable of depositing carbon. In so doing, the primary carbon formed by the charring is deposited in and lines the pores of the kieselguhr, while the vapors and gases produced in charring are allowed an opportunity to escape without production of secondary carbon which may clog the pores. With too rapid heating vapors and gases tend to be taken up by the kieselguhr and char in its pores, the pores becoming clogged. It is not the object in the present invention to have the pores of the kieselguhr clogged to any material extent, since it is upon their existence that the kieselguhr depends, for some reason, for its clarifying activity. I wish to secure enough decolorizing carbon in the kieselguhr to give the preparation an effective decolorizing power without having enough present to forfeit the clarifying power. With a forfeiture of the clarifying power, the decolorizing power would also disappear, since the decolorizing carbon would in this event be sealed in, to a greater or less extent, in the pores beyond the easy access of the liquid to be treated.

In a practical embodiment of the present invention, I may take any good ordinary grade of kieselguhr having a good clarifying activity and make it into a paste or dough with a water solution of an organic colloid. I find that good preparations may be made by treating the kieselguhr with a watery solution or milk of 1 to 15 per cent. ordinary starch, the amount of water being such as to enable the starch solution to be readily taken up by the kieselguhr with final production of a dough. The mixture may be heated to facilitate the formation of a dough. Cornstarch, potato starch, etc., may be employed. Ordinarily cornstarch is perfectly suitable. Instead of starch or in addition thereto, I may use other organic colloid matter, such as glue, gelatin, stick, etc. These latter materials give a nitrogen containing preparation of good decolorizing power. But I find the use of starch, on the whole, the best. With the starch solution may be used some molasses or other material containing soluble carbohydrates, such as sucrose, dextrose, etc. The dough-like mass is next converted into pellets of convenient size and these are charred in any way giving a slow heating action with ample opportunity for extrication of vapors and gases. The pellets may be charred in an ordinary vented retort and a current of dry steam or products of combustion sent through during the charring operation. Or the mixture may be made into thin layers in the bottom of shallow trays and these trays successively and slowly advanced through a tunnel-like heating chamber containing surface combustion burners (porous refractory plates or masses of granules supplied with air and gas). After carbonization is complete and the mass has attained a temperature of 600° C. or above, it is cooled in such a manner as to prevent ignition, as by dumping it into water, or blowing steam through the retort until the material is sufficiently cooled. The final preparation represents a material not unlike in physical properties the original kieselguhr and in particular as regards the existence of open pores but containing decolorizing carbon within the kieselguhr granules and having a very effective decolorizing power in addition to the clarifying power natural to the kieselguhr.

As so far described the preparation is substantially a kieselguhr having decolorizing properties. The amount of decolorizing activity which can be imparted to such a preparation is of course limited to some extent by the amount of carbon which can be deposited in the pores of the kieselguhr without clogging them. But the decolorizing power can be increased to any desired extent by mixing with the mass of kieselguhr and soluble carbohydrates a certain amount of carbonaceous matter, such as peat, lignite, etc., in powdered form, and charring the whole in the manner above described, in a vented retort through which dry steam is passed to assist in the removal of vapors. This results in a compound preparation consisting of mingled granules of decolorizing carbon and decolorizing kieselguhr. The organic matter used may be first treated with starch, etc., in the same manner as the kieselguhr. I find that in treating preparations containing kieselguhr the use of a current of dry steam (or products of combustion) is highly advantageous. In making a compound material containing both kieselguhr and granular organic matter, the kieselguhr acts in the same manner as the mineral spacing agent of my prior application. But it is, of course, not afterward removed from the finished material.

In charring together this mixture of kieselguhr impregnated with carbohydrates, and carbonaceous matter mixed with carbohydrates, a compound decolorizing and clarifying material composed of kieselguhr and decolorizing carbon is produced, the efficiency of which is greater than that of a simple mechanical mixture of ordinary kieselguhr with decolorizing carbon. On charring the dough in the manner hereinbefore described, the impregnated kieselguhr granules and the granules of vegetable material char simultaneously with the production of carbon of a high degree of decolorizing activity.

What I claim is:—

1. The process of making a clarifying and decolorizing agent which comprises impregnating kieselguhr with starch and slowly charring through a range of temperatures ending above 600° C. under circumstances permitting a free escape of vapors produced in charring.

2. The process of making a clarifying and decolorizing agent which comprises mixing kieselguhr with starch and water to make a dough-like preparation and slowly charring the dough-like material in the form of pellets or the like through a range of temperatures ending above 600° C. under circumstances permitting a free escape of vapors produced in charring.

3. The process of making a clarifying and decolorizing agent which comprises impregnating kieselguhr with starch to make a dough-like preparation and slowly charring the dough-like material in a vented retort through which a draft current of dry steam is passed to expedite removal of vapors, continuing the heating through a range of temperatures ending above 600° C. and cooling the finished product by passing a current of steam through the retort.

4. The process of making a clarifying and decolorizing agent which comprises impregnating kieselguhr with starch paste to make a dough-like mass, incorporating in said dough-like mass granulated vegetable matter and slowly charring through a range of temperatures ending above 600° C. under circumstances permitting a free escape of vapors produced in charring.

5. The process of making a compound clarifying and decolorizing agent which comprises producing a dough-like mass of ordinary kieselguhr, starch, water and powder carbonaceous matter, and slowly charring the mixture so produced in a vented retort through which a draft current of dry steam is passed to facilitate removal of vapors, the heating being continued through a range of temperatures ending above 600° C.

6. The process of making a clarifying and decolorizing agent which comprises impregnating kieselguhr with a solution of starch and admixture of powdered carbonaceous matter to make a dough-like mass, slowly charring the mixture in a vented retort through which a draft current of dry steam is passed to facilitate removal of vapors and continuing the heating through a range of temperatures ending above 600° C.

In testimony whereof, I affix my signature hereto.

RUSSELL WILLIAM MUMFORD.

Witness:
ALICE PERRIN.